May 21, 1957 F. R. CAPPS 2,792,790
FLUID PUMP
Filed Aug. 7, 1950
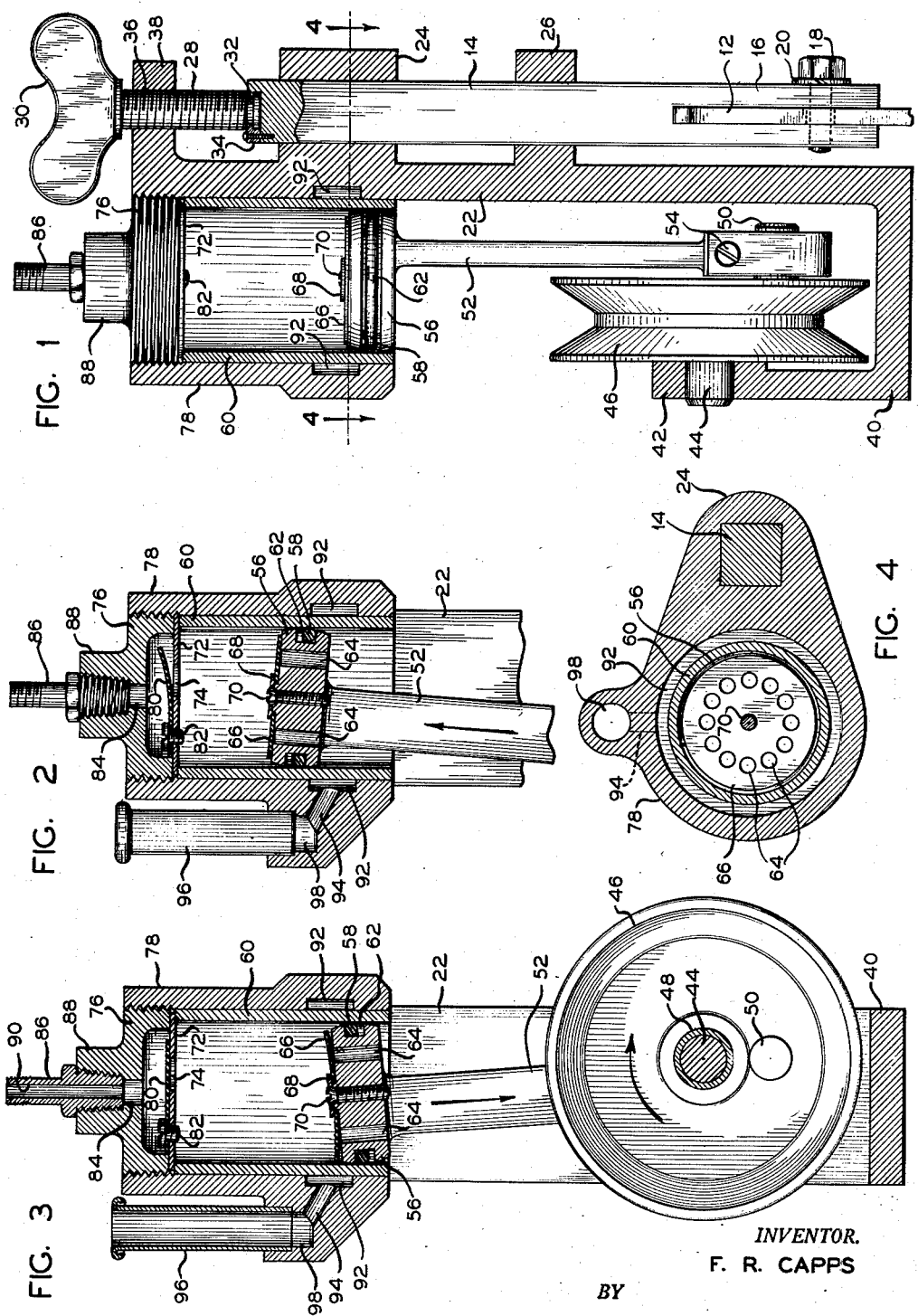
INVENTOR.
F. R. CAPPS
BY
A. Yates Dowell
ATTORNEY

United States Patent Office 2,792,790
Patented May 21, 1957

2,792,790

FLUID PUMP

Frank R. Capps, Jacksonville, Fla.

Application August 7, 1950, Serial No. 178,095

12 Claims. (Cl. 103—178)

This invention relates to a pump and more particularly to a small, high speed, high volume pump which is especially adapted to be attached to the motor of an automobile or similar vehicle, and may be used in an emergency for pumping up tires, for compressing refrigerant for use in a cooling system, or for pumping fluid for operating a hydraulic system.

Other devices have been proposed for a similar purpose, but these were either too complicated and expensive to manufacture, or were inefficient and not sufficiently durable for prolonged use.

One object of the present invention is to provide an apparatus which overcomes the disadvantages enumerated above and provides a simple and inexpensive pump which is adapted to deliver a large volume at high speed with a minimum of wear on the parts thereof.

Another object of the present invention is to provide a pump which is slidably mounted on a support which is attached to a bracket of a motor in such manner that by moving the pump in one direction the drive pulley is caused to engage the fan belt or other drive belt to put the pump in operation, or by moving the pump in the other direction the pulley is disengaged to stop the pump from operating.

A still further object of the present invention is to provide a pump having an integrally formed piston and connecting rod wherein the rod is offset from the center line of the piston, and further providing the piston with holes therethrough and a flexible disc mounted on the top thereof to provide an intake port.

Another object of the present invention is to provide a pump having a piston with an O-section piston ring formed of resilient rubber-like material and also having a porous metallic cylinder liner surrounded by an oil cavity to provide sufficient lubrication by seepage through the liner to prevent excessive wear on the rubber-like ring.

In one preferred embodiment of the invention, as disclosed herein, an air pump is disclosed having a supporting frame which is slidably mounted on a bar adapted to be attached to any suitable mounting bracket on a motor and provided with means for moving the frame longitudinally with respect to the bar. A pulley rotatably mounted on the frame is provided with an eccentric pin engaging one end of a crank shaft which has a piston integrally formed in offset relation thereto at the opposite end. The piston is provided with a curved periphery having a peripheral ring groove to receive an O-section piston ring formed of rubber-like material and also has a plurality of ports therethrough controlled by a flexible disc on the top of the piston. The piston reciprocates within a porous metallic liner provided in a cylinder having a supply of oil to an annular groove from which the oil seeps through the porous walls of the cylinder liner for lubricating the piston and piston ring. A flap valve is provided adjacent the cylinder head to provide for outward flow of compressed fluid through a suitable conduit. Movement of the frame carrying the pump and pulley in one direction relative to the mounting bar will engage the pulley with a drive belt such as the one used to drive the generator of a motor and movement in the opposite direction will disengage the pulley from the drive belt to control the operation of the pump.

Further objects and advantages of the invention will be apparent from the following description taken in conjunction with the drawings, wherein:

Fig. 1 is a longitudinal sectional view of one preferred form of the present invention;

Fig. 2, a fragmentary sectional view showing the piston and connecting rod during the upward portion of the stroke;

Fig. 3, a longitudinal sectional view showing the piston during the downward portion of the stroke; and Fig. 4, a sectional view taken on the line 4—4 of Fig. 1.

Referring now to the drawings in detail and more particularly to Fig. 1, a portion of any suitable mounting bracket such as the generator bracket is indicated by numeral 12. Mounting bar 14 is provided with a forked end 16 which slides over the bracket 12 and is secured thereto by bolt 18 which is securely held in position by lock washer 20. The mounting bar is preferably non-circular in cross section and, as shown in Fig. 4, has been illustrated as being square in cross section.

A supporting frame 22 is provided with ears 24 and 26 which have square openings slidably engaging the mounting bar 14.

A handle 30 having a threaded shank 28 is swivelled on the upper end of the mounting bar 14 by means of a shouldered projection 32 which is held in position by a detachable clip 34. The threaded portion of member 28 extends through an internally threaded opening in another projection 38 on the supporting frame.

Supporting frame 22 is provided with a U-shaped arm 40 having a thickened portion 42 receiving a pin 44 on which the pulley 46 in rotatably mounted by means of an oil-less bearing 48. A pin 50 is eccentrically mounted on the pulley 46 and rotatably engages the lower end of the connecting rod 52 which is provided with an oil-less bearing (not shown) secured in position by a clamping screw 54.

A piston 56 is integrally formed on the upper end of connecting rod 52 and, as clearly shown in Figures 1, 2 and 3, the center line of the piston is offset in both directions with relation to the connecting rod 52. The offset in one direction, as shown in Fig. 1, provides for a more compact arrangement of the elements of the pump, and the offset in the other direction, as shown in Figs. 2 and 3, maintains the piston as nearly as possible in proper alignment with the cylinder walls during the upward stroke; that is, the piston does not cock as much during the upward stroke as it does during the downward stroke. This allows the ring 58 to maintain the compression until the upward stroke is completed, whereas on the downward stroke substantially cocking of the piston within the cylinder does not materially affect the operation. The curved periphery of the piston permits substantial cocking without binding against the cylinder liner 60.

The piston ring 58 is preferably formed of a soft, flexible and elastic material such as rubber and is substantially O-shaped in cross section. Ring 58 is seated in an annular groove 62 somewhat larger than the ring and, due to its O-section and the use of a rubber-like material, will maintain contact with the walls of the liner 60 in the various cocked positions of the piston.

The piston 56 is further provided with a plurality of longitudinal ports 64 arranged in a circular formation, as shown in Fig. 4. Ports 64 are controlled by a flexible disc 66 which is loosely held in position by a washer 68 secured to the top of the piston by machine screw 70, Disc 66 permits flow of fluid into the cylinder during the downward stroke, but prevents outward flow during the upward stroke.

A rigid disc 72 having an opening 74 is clamped in position against the top of the cylinder liner 60 by a screw-threaded head 76 screwed into the top of the cylinder 78 which is formed integral with the supporting frame 22. A flap valve 80 formed of flexible material is secured to the disc 72 by machine screw 82 and controls outward flow of compressed fluid through the opening 74 and thence through an opening 84 in the cylinder head 76. A nipple 86 is threaded into a circular boss 88 on top of the cylinder head 76 and is provided with an axial bore 90 through which the fluid may pass. The nipple 86 may be connected by means of suitable piping, or a flexible conduit to any desired apparatus or to an air valve for pumping up tires.

Cylinder liner 60 is formed of porous metal or other suitable porous material through which lubricant is adapted to seep from an annular groove 92 formed in the enlarged lower portion of the cylinder block 78. A lubricant, such as oil, is fed to the annular groove 92 through a conduit 94 from a lubricant storage receptacle or reservoir 96 which is secured in the shouldered recess 98 formed in the cylinder block 78.

By using the proper lubricant, such as a suitable grade of oil, the oil will not flow through the cylinder wall except when the pump is running. The running of the pump warms up the walls of the liner and the oil contained in the pores of the liner will then seep through gradually to give sufficient lubrication for preventing excessive wear on the piston ring 58.

The operation of the apparatus will be obvious from the above description, but it may be pointed out that, when the mounting bar 14 is secured to a cylinder bracket 12 with pulley 46 adjacent a moving belt, such as the belt used to drive the fan or generator of a gasoline motor, rotation of the handle 30 in one direction will move the pulley toward the belt to initiate operation of the pump, and rotation of the handle 30 in the opposite direction will move the pulley 46 away from the belt to discontinue operation of the pump.

Although the structure disclosed is intended to be used for pumping or compressing air, it will be obvious that a pump of this kind may be used for many different purposes by a slight modification of the apparatus shown herein. For instance, it may be utilized for pumping liquids to operate a hydraulic system in conjunction with a tractor or for compressing a refrigerant for use in a cooling system by merely enclosing a portion of the apparatus and providing conduits to return the liquid or refrigerant to a point where it can be drawn into the cylinder through the ports 64.

It will be obvious to those skilled in the art that various changes may be made in the invention without departing from the spirit and scope thereof and, therefore, the invention is not limited by that which is shown in the drawings and described in the specification, but only as indicated in the appended claims.

What is claimed is:

1. A fluid pump comprising a mounting bar non-circular in cross-section and having means for attachment to a supporting bracket, a supporting frame having a U-shaped arm adjacent one end thereof, said supporting frame being slidably mounted on said mounting bar, a pulley rotatably mounted within said U-shaped arm adjacent one end of said supporting frame and having an eccentric pin thereon, a cylinder mounted at the opposite end of said supporting frame and having an annular groove within the lower portion thereof, a porous metallic cylinder liner within said cylinder, a connecting rod having one end rotatably connected to said eccentric pin and a piston integrally connected to the opposite end thereof, said piston being positioned for reciprocation within said cylinder liner and provided with a curved periphery having a peripheral ring groove, the axis of said piston being offset in one radial direction with respect to said connecting rod and in the opposite direction with respect to the axis of said pulley whereby cocking of the piston is minimized during the compression stroke, the extended axis of said piston being intermediate the sides of said U-shaped arm and offset from said rod in a radial direction perpendicular to said one radial direction, an O-section piston ring formed of rubber-like material and loosely seated in said ring groove, an oil reservoir communicating with said annular groove, a plurality of ports extending through said piston and means controlling said ports to permit only inward flow to said cylinder, a cylinder head on said cylinder having a passage therethrough and control means adjacent said head permitting flow only in a direction outwardly from said cylinder, and means for moving said supporting frame longitudinally with respect to said mounting bar, said moving means comprising a handle having a threaded shank extending through an internally threaded opening in said supporting frame and swivelled on said mounting bar.

2. A fluid pump comprising a mounting bar having means for attachment to a supporting bracket, a supporting frame slidably mounted on said mounting bar, a pulley rotatably mounted adjacent one end of said supporting frame and having an eccentric pin thereon, a cylinder mounted at the opposite end of said supporting frame and having an annular groove within the lower portion thereof, a lubricant reservoir communicating with said groove, a porous metallic cylinder liner within said cylinder, a connecting rod having one end rotatably connected to said eccentric pin and a piston integrally connected to the opposite end thereof, said piston being positioned for reciprocation within said cylinder liner and provided with a curved periphery having a peripheral ring groove, the axis of said piston being offset in one radial direction with respect to said connecting rod and in the opposite direction with respect to the axis of said pulley whereby cocking of the piston is minimized during the compression stroke, the extended axis of said piston being offset from said rod in a radial direction perpendicular to said one radial direction, an O-section piston ring formed of rubber-like material and loosely seated in said ring groove, a plurality of ports extending through said piston and means controlling said ports to permit only inward flow to said cylinder, a cylinder head on said cylinder having a passage therethrough and control means adjacent said head permitting flow only in a direction outwardly from said cylinder, and means for moving said supporting frame longitudinally with respect to said mounting bar.

3. A fluid pump comprising a mounting bar having means for attachment to a supporting bracket, a supporting frame slidably mounted on said mounting bar, a pulley rotatably mounted adjacent one end of said supporting frame and having an eccentric pin thereon, a cylinder mounted at the opposite end of said supporting frame and having an annular groove within the lower portion thereof, a porous metallic cylinder liner within said cylinder, a connecting rod having one end rotatably connected to said eccentric pin and a piston integrally connected to the opposite end thereof, said piston being positioned for reciprocation within said cylinder liner and provided with a curved periphery having a peripheral ring groove, the axis of said piston being offset in one radial direction with respect to said connecting rod and in the opposite direction with respect to the axis of said pulley whereby cocking of the piston is minimized during the compression stroke, an O-section piston ring formed of rubber-like material loosely seated in said ring groove, an oil reservoir communicating with said annular groove, a plurality of ports extending through said piston and means controlling said ports to permit only inward flow to said cylinder, a cylinder head on said cylinder having a passage therethrough and control means adjacent said head permitting flow only in a direction outwardly from said cylinder, and means for moving said supporting frame longitudinally with respect to said mounting bar.

4. A fluid pump comprising a mounting bar having means for attachment to a supporting bracket, a supporting frame slidably mounted on said mounting bar, a pulley rotatably mounted adjacent one end of said supporting frame and having an eccentric pin thereon, a cylinder mounted at the opposite end of said supporting frame and having an annular groove within the lower portion thereof, a porous metallic cylinder liner within said cylinder, a connecting rod having one end rotatably connected to said eccentric pin and a piston integrally connected to the opposite end thereof, said piston being positioned for reciprocation within said cylinder liner and provided with a curved periphery having a peripheral ring groove, an O-section piston ring formed of an elastic material and loosely seated in said ring groove, an oil reservoir communicating with said annular groove, a plurality of ports extending through said piston and means controlling said ports to permit only inward flow to said cylinder, a cylinder head on said cylinder having a passage therethrough and control means adjacent said head permitting flow only in a direction outwardly from said cylinder, and means for moving said supporting frame longitudinally with respect to said mounting bar.

5. A fluid pump comprising a mounting bar having means for attachment to a supporting bracket, a supporting frame slidably mounted on said mounting bar, a pulley rotatably mounted adjacent one end of said supporting frame and having an eccentric pin thereon, a cylinder mounted at the opposite end of said supporting frame, a connecting rod having one end rotatably connected to said eccentric pin and a piston integrally connected to the opposite end thereof, said piston being positioned for reciprocation within said cylinder and provided wtih a curved periphery having a peripheral ring groove, an O-section piston ring formed of rubber-like material loosely seated in said ring groove, a plurality of ports extending through said piston and means controlling said ports to permit only inward flow to said cylinder, a cylinder head on said cylinder having a passage therethrough and control means adjacent said head permitting flow only in a direction outwardly from said cylinder, and means for moving said supporting frame longitudinally with respect to said mounting bar.

6. A fluid pump comprising a mounting bar having means for attachment to a supporting bracket, a supporting frame slidably mounted on said mounting bar, said frame having a U-shaped arm adjacent one end thereof, a pulley rotatably mounted within said U-shaped arm and having an eccentric pin thereon, a cylinder mounted at the opposite end of said supporting frame, a connecting rod having one end rotatably connected to said eccentric pin and a piston integrally formed on the opposite end thereof, said piston being positoned for reciprocation within said cylinder and provided with a curved periphery having a peripheral ring groove, the axis of said piston being offset in one radial direction with respect to said connecting rod and in the opposite direction with respect to the axis of said pulley whereby cocking of the piston is minimized during the compression stroke, the extended axis of said piston being intermediate the sides of said U-shaped arm and offset from said rod in a radial direction perpendicular to said one radial direction, an O-section piston ring formed of rubber-like material and loosely seated in said ring groove, an oil reservoir communicating with said cylinder, a plurality of ports extending through said piston and means controlling said ports to permit only inward flow to said cylinder, a cylinder head on said cylinder having a passage therethrough and control means adjacent said head permitting flow only in a direction outwardly from said cylinder, and means for moving said supporting frame longitudinally with respect to said mounting bar, said means comprising a handle having a threaded shank extending through an internally threaded opening in said supporting frame and swivelled on said mounting bar.

7. A fluid pump comprising a mounting bar having means for attachment to a supporting bracket, a supporting frame slidably mounted on said mounting bar, said frame having a U-shaped arm adjacent one end thereof, a pulley rotatably mounted within said U-shaped arm and having an eccentric pin thereon, a cylinder mounted at the opposite end of said supporting frame, a connecting rod having one end rotatably connected to said eccentric pin and a piston integrally formed on the opposite end thereof, said piston being positioned for reciprocation within said cylinder, the axis of said piston being offset in one radial direction with respect to said connecting rod and in the opposite direction with respect to the axis of said pulley whereby cocking of the piston is minimized during the compression stroke, the extended axis of said piston being intermediate the sides of said U-shaped arm and offset from said rod in a radial direction perpendicular to said one radial direction, a plurality of ports extending through said piston and means controlling said ports to permit only inward flow to said cylinder, a cylinder head on said cylinder having a passage therethrough and control means adjacent said head permitting flow only in a direction outwardly from said cylinder, and means for moving said supporting frame longitudinally with respect to said mounting bar, said means comprising a handle having a threaded shank extending through an internally threaded opening in said supporting frame and swivelled on said mounting bar.

8. A fluid pump comprising a mounting bar having means for attachment to a supporting bracket, a supporting frame slidably mounted on said mounting bar, a pulley rotatably mounted adjacent one end of said supporting frame and having an eccentric pin thereon, a cylinder mounted at the opposite end of said supporting frame, a connecting rod having one end rotatably connected to said eccentric pin and a piston integrally connected to the opposite end thereof, said piston being positioned for reciprocation within said cylinder and provided with a curved periphery having a peripheral ring groove, the axis of said piston being offset with respect to said connecting rod whereby cocking of the piston is minimized during the compression stroke, an O-section piston ring formed of rubber-like material and loosely seated in said ring groove.

9. A fluid pump comprising a mounting bar having means for attachment to a supporting bracket, a supporting frame slidably mounted on said mounting bar, a pulley rotatably mounted adjacent one end of said supporting frame and having an eccentric pin thereon, a cylinder mounted at the opposite end of said supporting frame, a connecting rod having one end rotatably connected to said eccentric pin and a piston integrally connected to the opposite end thereof, said piston being positioned for reciprocation within said cylinder and provided with a curved periphery, the axis of said piston being offset with respect to said connecting rod whereby cocking of the piston is minimized during the compression stroke, and means for moving said supporting frame longitudinally with respect to said mounting bar.

10. A fluid pump comprising a mounting bar noncircular in cross section having means for attachment to a supporting bracket, a supporting frame slidably mounted on said mounting bar, a pulley rotatably mounted adjacent one end of said supporting frame and having an eccentric pin thereon, a cylinder mounted at the opposite end of said supporting frame, a connecting rod having one end rotatably connected to said eccentric pin and a piston integrally connected to the opposite end thereof, said piston being positioned for reciprocation within said cylinder and provided with a curved periphery, and means for moving said supporting frame longitudinally with respect to said mounting bar, said means comprising a handle having a threaded shank extending through an internally threaded opening in said supporting frame and swivelled on said mounting bar.

11. A fluid pump comprising a cylinder, a connecting rod having a piston integrally formed on one end thereof, said piston being positioned within said cylinder and having a longitudinally curved periphery, said piston also having a peripheral ring groove and an elastic O-section ring seated in said ring groove, said cylinder having an annular groove within the lower portion thereof, a lubricant reservoir communicating with said groove, and a porous cylinder liner within said cylinder adapted to provide seepage of lubricant therethrough, and rotary drive means having an eccentric pin operatively connected to the other end of said rod.

12. A fluid pump comprising a frame of substantially C-shape with a cylinder at one extremity with the axis of the cylinder extending toward the other extremity and closed at its outer end and open at the end thereof adjacent the said other extremity of said C-frame, a wheel rotatably mounted on the other extremity of said C-frame for rotation about a fixed axis, a crank pin eccentric to the axis of rotation of said wheel and having a portion projecting toward the main body of the frame, an integral connecting rod and piston slideable in said cylinder and the connecting rod rotatably mounted on said crank pin, the connecting rod being secured to said piston eccentrically of the axis of the piston, means on the said C-frame for attaching said frame to a support, and means for moving the frame to and from a support for adjusting the position of said wheel whereby a belt may be engaged or disengaged from driving relation with said wheel.

References Cited in the file of this patent

UNITED STATES PATENTS

| | | |
|---|---|---|
| 364,627 | Arnold | June 14, 1887 |
| 1,388,087 | Bach | Aug. 16, 1921 |
| 1,450,135 | Clark | Mar. 27, 1923 |
| 1,634,768 | Bonner | July 5, 1927 |
| 1,747,537 | Babin | Feb. 18, 1930 |
| 1,775,892 | De Salardi | Sept. 16, 1930 |
| 1,938,329 | Gutman | Dec. 5, 1933 |
| 2,000,883 | Cullen | May 7, 1935 |
| 2,023,466 | Crowley | Dec. 10, 1935 |
| 2,314,683 | Berry | Mar. 23, 1943 |
| 2,361,086 | Carlson | Oct. 24, 1944 |
| 2,556,273 | Hedges | June 12, 1951 |
| 2,576,740 | Wilson | Nov. 27, 1951 |
| 2,710,137 | Arnoul | June 7, 1955 |

FOREIGN PATENTS

| | | |
|---|---|---|
| 529,885 | Great Britain | Nov. 29, 1940 |